Figure 1:
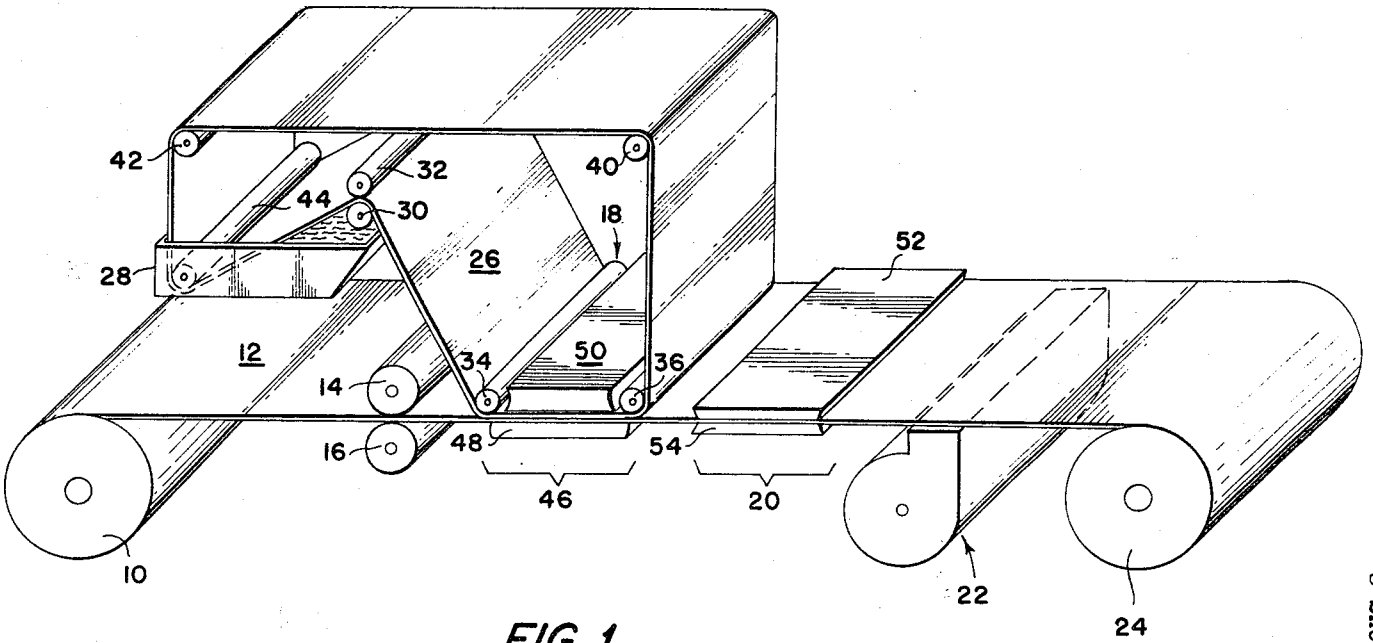
Figure 2:
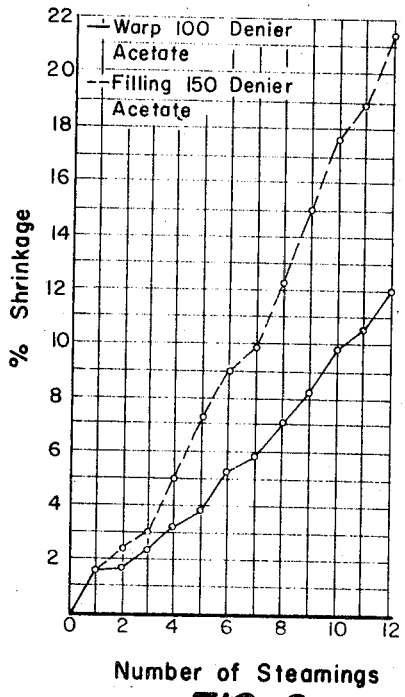
Figure 3:
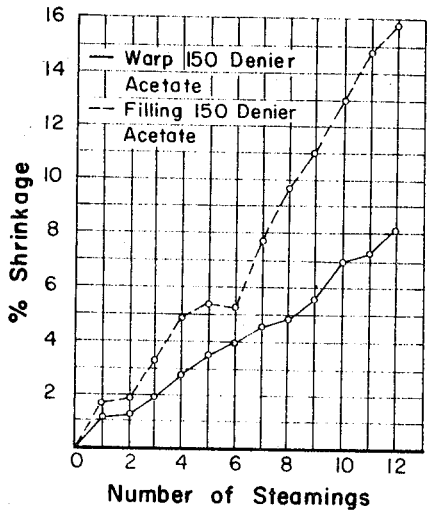
Figure 4:
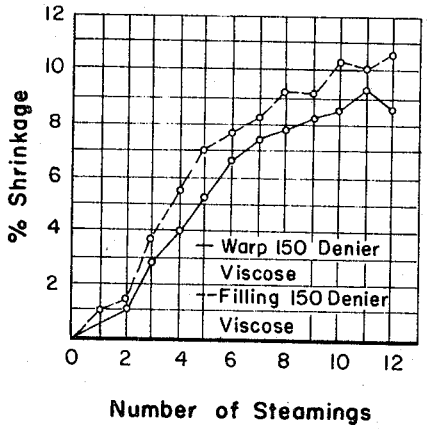
Figure 5:
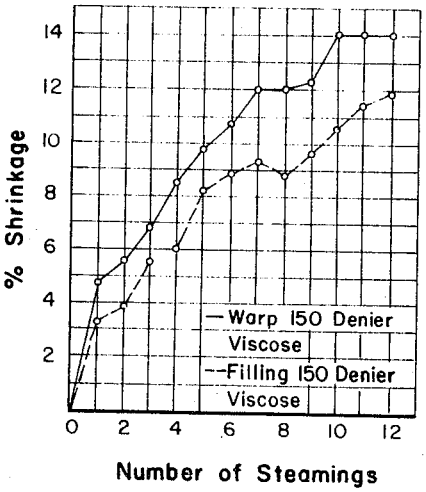
Figure 6:
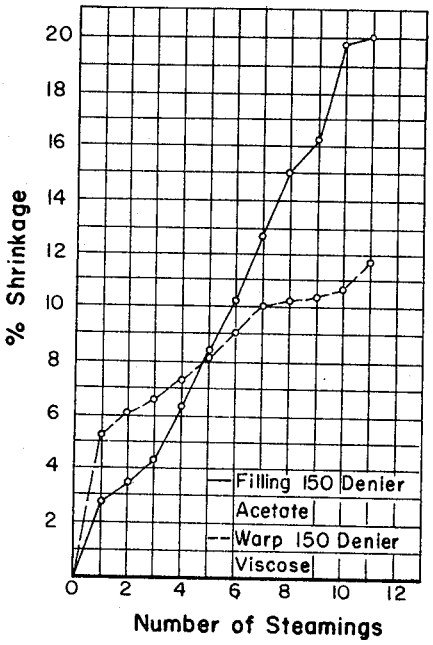
Figure 7:
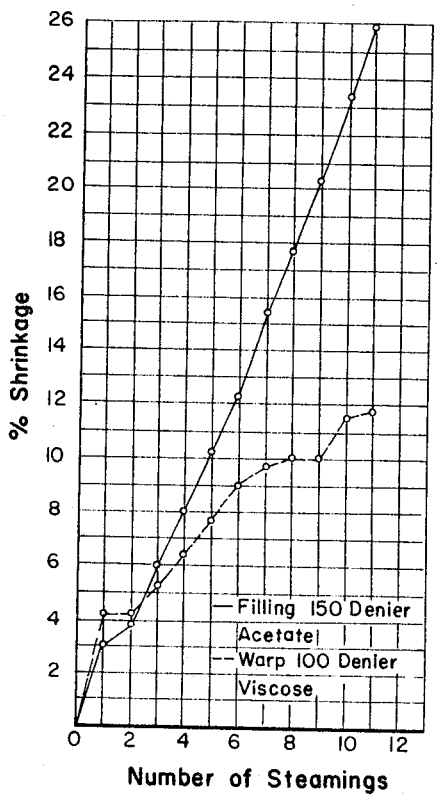
Figure 8:
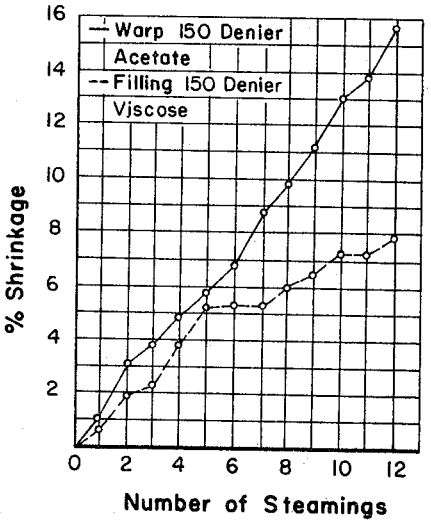
Figure 9:
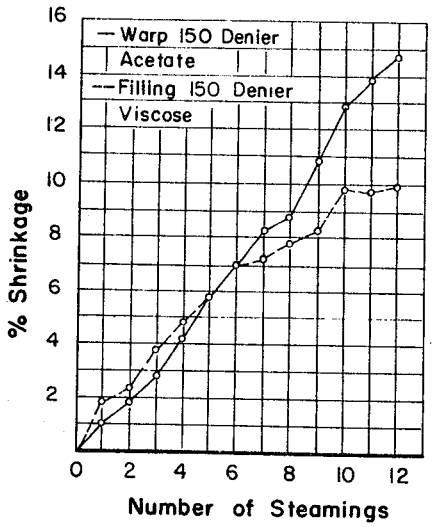

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 26, 1970

874 O.G. 1021

T874,013
PROCESS FOR PRODUCING STRETCH FABRICS

Robert L. Ammons, 2237 Charsley Road,
Kingsport, Tenn. 37660

Filed Oct. 30, 1969, Ser. No. 872,652
Int. Cl. D06c *1/06*
U.S. Cl. 28—76
3 Sheets Drawing. 26 Pages Specification

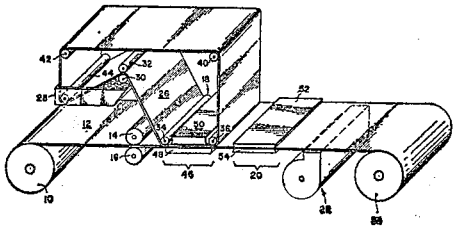

Process for imparting stretch characteristics to a woven fabric containing synthetic fibers, especially cellulosic fibers. The process comprises applying steam to the fabric, preferably by placing a damp cloth over the fabric and applying light pressure to the cloth to press it against the fabric being treated. The damp cloth is heated to a temperature sufficient to convert the water in the cloth to steam. The fabric is then baked for a period of time in the absence of moisture, usually in a temperature of about 220°–240° F. Subsequently the fabric is cooled to room temperature. The desired amount of stretchability, is attained by repeating the above-described cycle of steps a number of times, the particular number of cycles depending upon the nature of the fabric and upon the nature of the stretch characteristics desired in the fabric. Usually the cycle of steps would be repeated from about 10 to 40 times. The process can be operated as a batch process, a semi-continuous process or a continuous process. Also the basic process can be applied to fibers before processing into a fabric.

May 26, 1970 R. L. AMMONS T874,013

PROCESS FOR PRODUCING STRETCH FABRICS

Filed Oct. 30, 1969 3 Sheets-Sheet 1

INVENTOR
ROBERT L. AMMONS

PROCESS FOR PRODUCING STRETCH FABRICS

Filed Oct. 30, 1969

INVENTOR
ROBERT L. AMMONS

PROCESS FOR PRODUCING STRETCH FABRICS

Filed Oct. 30, 1969

INVENTOR
ROBERT L. AMMONS